United States Patent [19]

Hengesbach

[11] 3,727,841
[45] Apr. 17, 1973

[54] MULTIPLE JET FLUID SPRINKLING, SPRAYING AND DIFFUSING DEVICE

[76] Inventor: Robert W. Hengesbach, 7886 Munson Road, Mentor, Ohio 44060

[22] Filed: Sept. 7, 1971

[21] Appl. No.: 178,355

[52] U.S. Cl. .................239/145, 239/269, 239/450, 239/532, 239/543, 239/547
[51] Int. Cl. ...........................A01g 25/14, B05b 1/20
[58] Field of Search.......................239/145, 266, 267, 239/268, 269, 450, 532, 543, 547, 588, DIG. 1, 407

[56] References Cited

UNITED STATES PATENTS

| 3,133,588 | 5/1964 | Pappas | 239/547 |
| 2,314,525 | 3/1943 | Summers | 239/547 X |
| 2,851,306 | 9/1958 | Huffaker | 239/543 X |
| 2,771,320 | 11/1956 | Korwin | 239/450 UX |
| 1,896,202 | 2/1933 | Richardson | 239/543 |
| 528,144 | 10/1894 | Cadwell | 239/543 |
| 1,484,575 | 2/1924 | Shulin | 239/450 UX |
| 1,802,626 | 4/1931 | Boyd et al | 239/543 X |
| 1,914,850 | 6/1933 | Foster | 239/269 |

FOREIGN PATENTS OR APPLICATIONS

| 1,324,345 | 3/1963 | France | 239/407 |
| 1,177,968 | 4/1959 | France | 239/532 UX |
| 813,802 | 5/1959 | Great Britain | 239/547 |
| 285,398 | 9/1952 | Switzerland | 239/268 |

*Primary Examiner*—Robert S. Ward, Jr.
*Attorney*—John Harrow Leonard

[57] ABSTRACT

Small diameter, normally straight tubes, some having discharge ports distributed along their lengths, and some being imperforate, are detachably connected in selected orders to form an elongated dispensing pipe line which is connectable at one end to a source of fluid under pressure and is plugged at the other end. The tubes are readily flexible transversely of their axes into curvilinear shapes throughout a wide range of radii, ranging from about 6 inches upwardly, by forces applied by the hands of an operator while his hands directly grip the tube. The tubes retain their normal cross sectional shape when so curved. They are of a plastic material having a good memory so that they are self-restoring or readily restorable manually to original lineal condition by reverse bending by hand. They are highly resistant to permanent or elastic deformation, or radial collapse, of their cross section. The tubes are so fully resistant to torsional deformation by manually applied forces and the coupling between the tubes hold the tubes so tightly that an operator, by applying rotational or torsional forces to any one of the tubes manually while gripping it directly in his hands, can rotate the entire line as a unit with each tube retaining its fixed rotated position relative to the others.

The tubes can be connected together with the ports of any tube directed at a different angle about the common axis from the ports of other tubes.
The ports of some tubes may be arranged in pairs with the ports of each pair directed so that the discharged jets impinge on each other abruptly and create a fog or mist.

The tubes may be detachably connected together in various rotated positions about their axes, and also with their axes in various angular positions resistive to each other for building temporary shower and auto washing structures.

9 Claims, 25 Drawing Figures

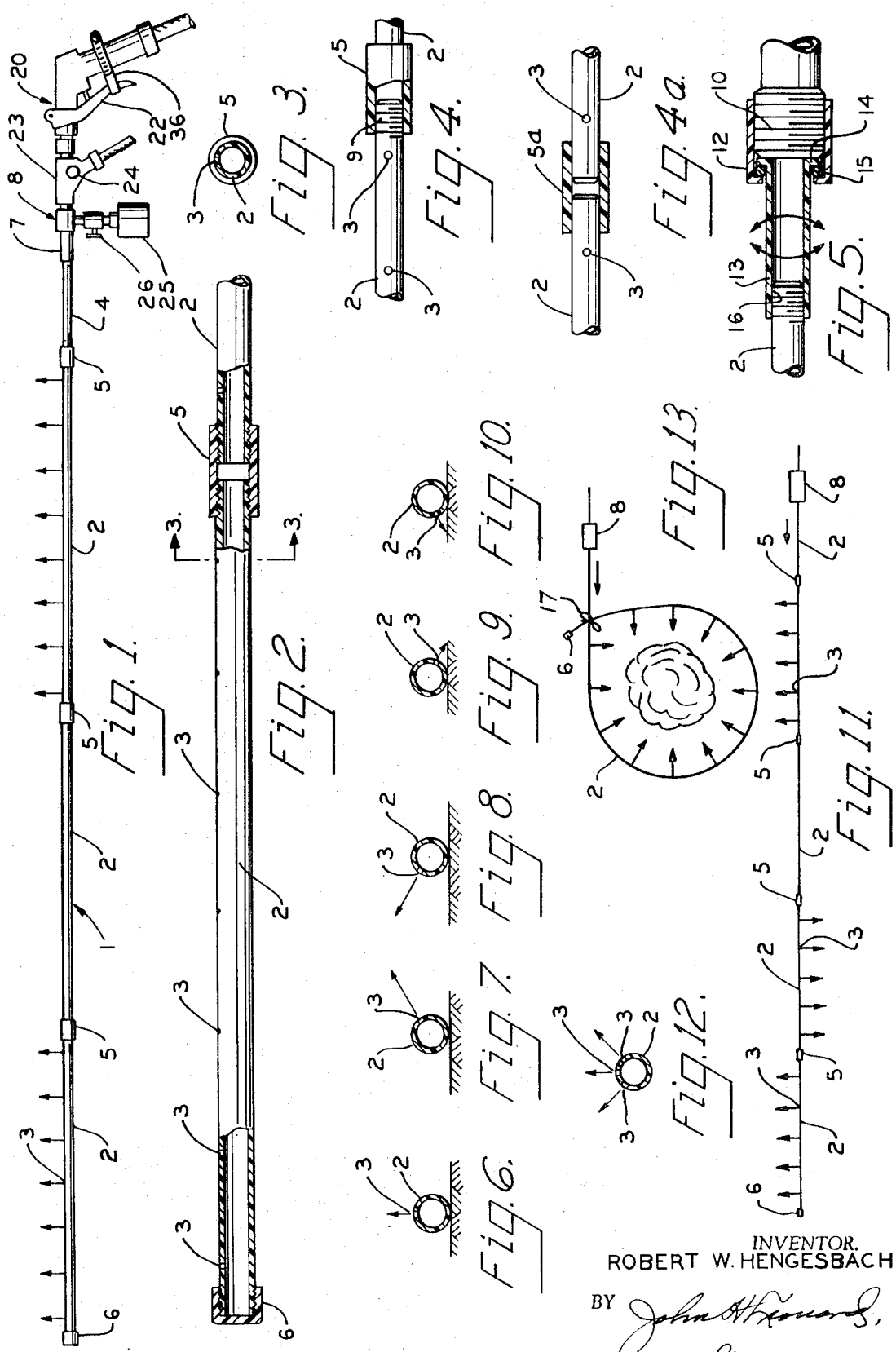

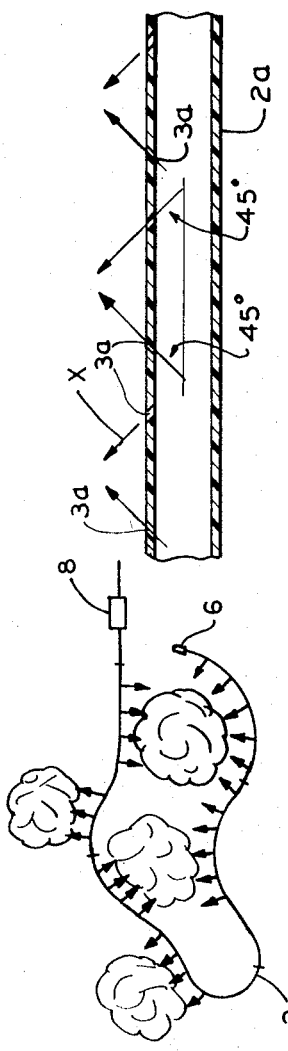
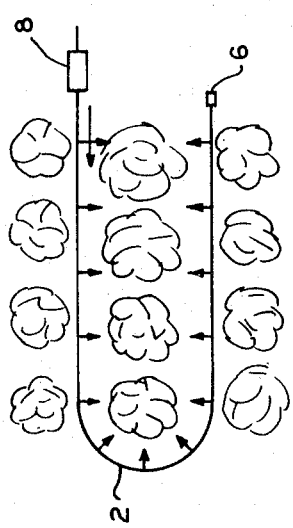
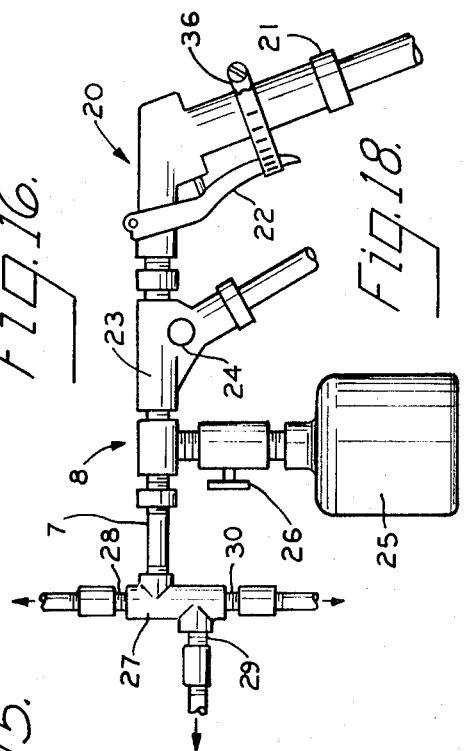
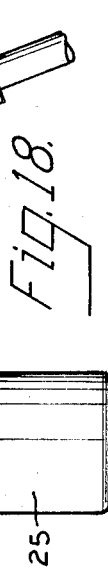
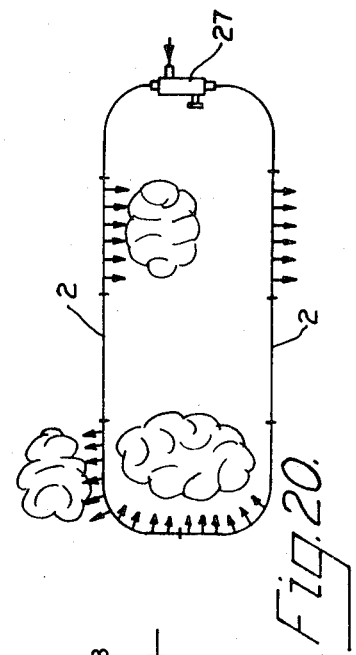
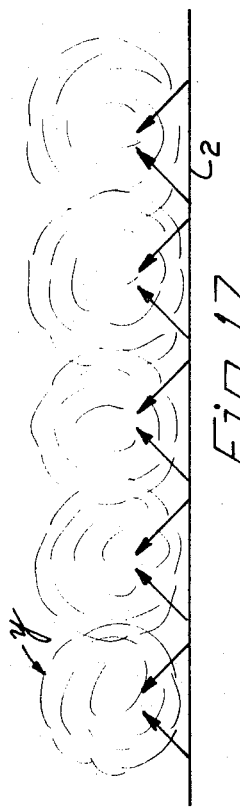
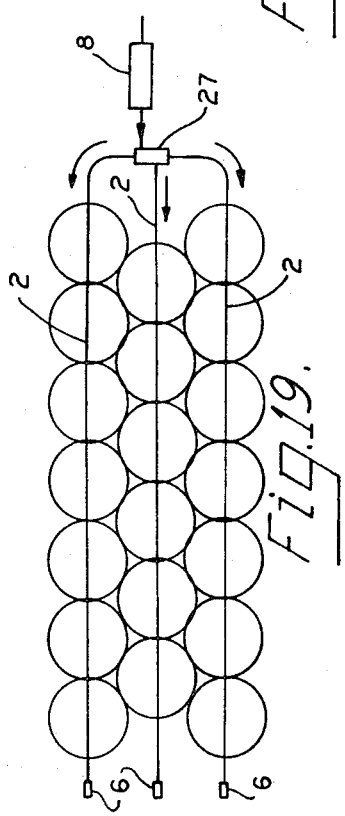

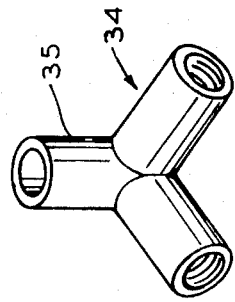
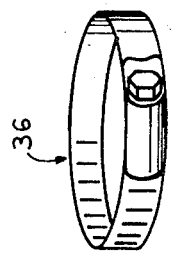
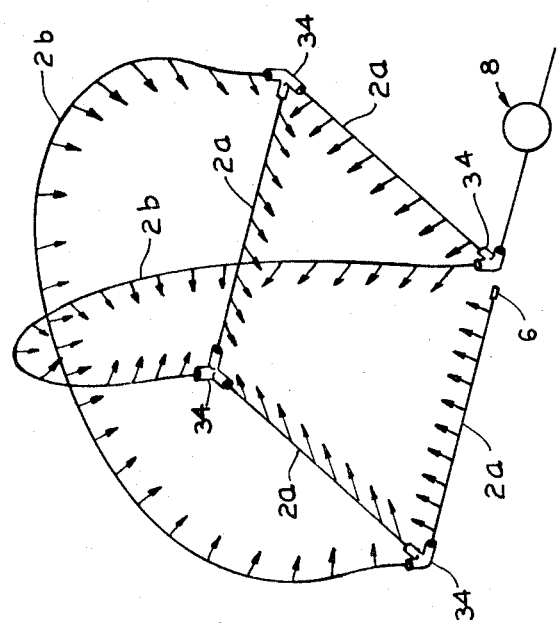
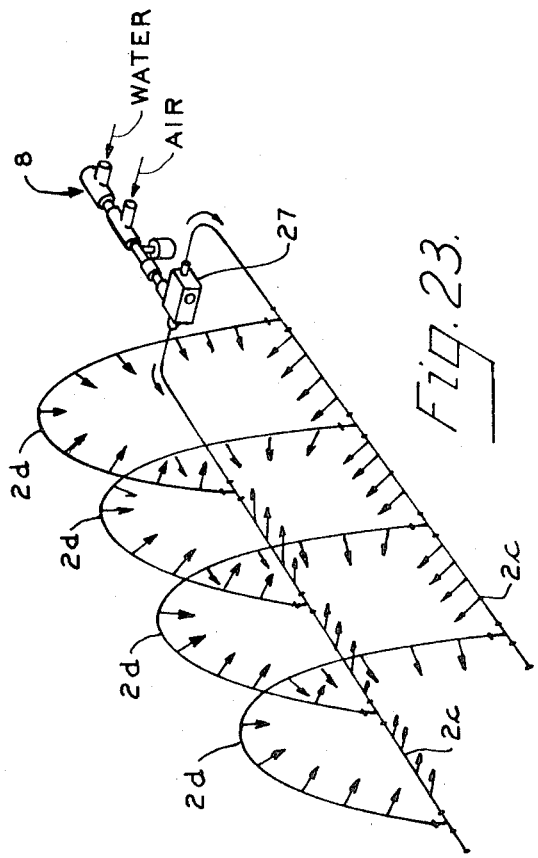
INVENTOR.
ROBERT W. HENGESBACH

MULTIPLE JET FLUID SPRINKLING, SPRAYING AND DIFFUSING DEVICE

BACKGROUND OF INVENTION

1. Field of Invention

The invention relates to a dispenser for pressurized fluid, such as a fluid sprinkling, spraying and diffusing device in the form of a pipe line having a plurality of discharge ports distributed along its length. It is directed particularly to a pipe line for domestic use in watering lawns and plating plots, though it may be used for distributing other liquids and solutions, gases, or fluids in general, for various other uses.

2. Description of Prior Art

Heretofore, in commercial gardening, it has been customary to install temporarily between rows of plants rigid iron or metal pipe lines having spray ports spaced at regular intervals along their lengths. Generally, these pipe lines are supported on the ground or on elevated supports and are intended to remain in fixed position throughout the growing season. Each line usually is specialized for the particular type of planting to which it is to supply water. The sprinkling water is supplied through the usual faucet.

In some instances, such pipe lines are placed underground in lawns and have risers fitted at their upper ends with spray nozzles.

Another type of watering device for home use is the so-called "soaker," which generally is in the form of a limp, elongated collapsible sheath which either is porous or has minute discharge perforations regularly distributed thereover. The sheath is connected at one end to a garden hose. When distended by the water pressure, the sheath is about 1 to 2 inches in diameter. The porosity, or size of perforations is such that the water discharge ranges from a low exudation or dribbles to short needle fine jets extending a few inches from the sheath, so as to limit the application of the water to an area contiguous to the sheath.

Neither of the foregoing structures affords the flexibility in use that is desirable for meeting the watering and spraying conditions encountered in the usual household yard. Such yards have various localized planting areas, each for a different planting; some areas being limited to shrubs, others to flowers, some to garden vegetables, and others to lawn. Each area often requires a different amount and type of application of water, or combination of aqueous solutions of fertilizers or insecticides. These conditions are aggravated by the fact that different specific areas may be selected for different plantings from time to time and year to year, in which cases a fixed installation is impractical.

One main objection to the rigid pipe line type of sprinkler is that it is fixed both as to the direction and location of the spray jets and cannot be redirected readily to meet varying conditions. Further, the line itself cannot be moved close to an area to be watered so that a limited flow and small jets can be used to localize the watering very close to the base of the plants, or moved farther away so that a heavy flow and large jets can be used to apply the water over a large area and onto the upper reaches of the plants.

The soaker type of water device is adapted only for a very limited area and types of application of the water. Furthermore, they cannot be adjusted rotatably about their lengths from one end, since they are substantially limp and twist and buckle easily.

SUMMARY OF INVENTION

The present device is directed to an elongated pipe line having discharge ports distributed along its length and controlled by a valve capable of admitting thereinto water, aqueous solutions of fertilizer and of insecticides, and other liquids or gases from a pressure source at controlled rates of flow. The pipe line is light in weight and positionable readily by hand in areas selected. It is manually bendable into curvilinear form so as to conform generally to the outline or pattern of the bed or plot to be watered, or into serpentine shape so as to pass between, around, or in close proximity to shrubs planted in random array. It can be arranged in parallel paths for row grown plantings, and into encircling relation to a selected shrub or tree. The pipe line can be disposed readily in a straight line, for general lawn watering, with the ports directed at the same or different angles about the pipe line axis. It can be rotated about its axis as a unit by hand, merely by grasping the pipe line at any selected location along its length and applying turning forces. The pipe line is sectional for ease in shipping and storage, and for flexibility in pattern of application of the discharge fluids. The size and forcefulness of the jets can be controlled and the jets can be converted into a mist when desired for certain applications. The jets can be emitted at different spaced zones along the line without discharge of fluids between the zones. Further, the tubes can be connected with their axes in angular relations so that some lengths can lie on the ground while the axes of others are directed abruptly upwardly from the ground, thus providing various sizes and shapes of shower and washing structures.

DESCRIPTION OF DRAWINGS

Various other objects of the invention will be apparent from the following description wherein reference is made to the drawings, in which:

FIG. 1 is a diagrammatic illustration of a lawn sprinkler embodying the principles of the present invention;

FIG. 2 is an enlarged fragmentary front elevation, partly in section, of the structure illustrated in FIG. 1;

FIG. 3 is a cross sectional view taken on the line 3—3 of FIG. 2;

FIG. 4 is an enlarged fragmentary plan view of a portion of one of the tubes illustrated in FIG. 2, showing the discharge ports and fragmentary part of the tube connecting means;

FIG. 4a is an enlarged fragmentary longitudinal sectional view of one type of connecting means connecting two tubes;

FIG. 5 is an enlarged fragmentary view, partly in section, showing the connecting means for connecting an end of one tube to a valve connectable to one or more sources of fluids under pressure;

FIGS. 6 through 10 are enlarged diagrammatic end elevations of the structure illustrated in FIG. 1, showing the different rotated positions of a tube for providing different directions of discharge of its jets;

FIG. 11 is a diagrammatic illustration, similar to FIG. 1, showing in plan view an arrangement of the tubes for providing a specialized spraying pattern;

FIG. 12 is an enlarged end elevation of the structure diagrammatically illustrated in FIG. 11;

FIG. 13 is a top plan view of the sprinkler illustrating its use for watering a limited locale around a single bush;

FIG. 14 is a diagrammatic plan view illustrating the adjustment of the structure for watering plants arranged in rows;

FIG. 15 is a diagrammatic plan view illustrating the adjustment of the structure for watering concurrently a number of plants in random array;

FIG. 16 is a fragmentary enlarged longitudinal sectional view showing a modified form of discharge ports in one of the tubes;

FIG. 17 is a diagrammatic view illustrating the manner of functioning of the length of tube such as illustrated in FIG. 16;

FIG. 18 is an enlarged fragmentary plan view illustrating a manifold and a control valve of the present invention;

FIG. 19 is a diagrammatic plan view illustrating one manner in which the manifold is used;

FIG. 20 is a diagrammatic plan view illustrating another method of combining the tubes with the manifold;

FIG. 21 is a diagrammatic perspective view illustrating a combination of the tubes providing a temporary outdoor shower;

FIG. 22 is an enlarged perspective view of a fitting used in the assembly shown in FIG. 21;

FIG. 23 is a diagrammatic perspective view of a combination of the tubes and fittings providing an auto wash; and FIG. 24 is a perspective view of a control clamp of the present invention.

Referring first to FIG. 1, the multiple jet fluid sprinkling, spraying and diffusing device, indicated generally at 1, comprises a plurality of tubes 2, having a row of discharge ports 3 therein, and a like tube 4 but without ports. All of the tubes are connected together in end to end series relation by detachable couplings 5. The terminal end of one end of one of the tubes 2 is plugged by a suitable detachable plug 6, and the terminal end of the other end of one of the tubes is provided with a swivel connection 7, as best illustrated in FIG. 5. The swivel connection connects the inlet end of its associated tube to a control valve 8.

The valve 8 preferably is such as described in my copending application, Ser. No. 723,377, filed Apr. 23, 1968, and now U.S. Pat. No. 3,632,046 so that the sprinkler can be supplied with water, aqueous solutions of fertilizer and pesticides, other liquids, and gases, combinations thereof, depending on the use to which the sprinkler is to be put.

Different types of connections may be used between adjacent ends of adjacent tubes. For example, the ends of the tubes may be threaded, as indicated at 9, and the complementarily threaded coupling 5 may be used therewith. Ordinarily, a tight and sealed connection can be effected directly by the hands, if the operator has a normal grip. The coupling may have one or more flats on its outer periphery so that it can be operated by pliers or a wrench by those having only a very weak grip.

If desired, however, a coupling 5a, such as illustrated in FIG. 4a, may be used. This coupling is one which effects the connection by a manual push fit with the adjacent ends of the tube.

Both types of couplings are satisfactory due to the nature of the synthetic plastic material of which both the tubes and the connectors are comprised.

For effecting the swivel connection with the control valve 8, the outlet end 10 of the valve is provided with the usual external threads for receiving a garden hose. An internally threaded sleeve or coupling member 12 is connectable to the end 10 and carries a tubular member 13 which extends through one end of the sleeve 12 and which has a radial flange 14 disposed within the coupling and engageable with an O-ring 15 for providing a seal while permitting relatively free rotation of the tubular member 13 about its axis. The other end of the member 13 may be internally threaded, as indicated at 16, for threaded connection with the threaded end of the associated tube 2. The member 13 may be unthreaded and of a diameter so that the associated tube 2 can be manually push-fitted thereinto. In either event, the member 13 is so freely rotatable that a line of over 40 feet in length can be rotated about its axis by an operator merely by grasping the terminal tube in a row directly in his hands and exerting moderate torsional force manually on the grasped tube. The coupling remains tight, and the entire line of tubes can be rotated thereby as a unit about the common axis.

The tubes preferably are extruded clear cellulose acetate butyrate having an outside diameter of three-eighths inches and an inside diameter of five-sixteenths inches. Tubes of this material are resilient and readily flexible, transversely of the axis, into curvilinear form at radii from 6 inches to as many feet as desired. They have a good memory and, when released from flexed condition after short time intervals, are self-restoring. After long intervals they sometimes tend to retain some curvature, but in such cases they can be restored to lineal condition by reverse flexure by forces manually applied. They resist manually applied torsional forces without elastic or permanent deformation. The couplings are of like material. Even though the coupling bores and the tubes are cylindrical, the tubes and couplings can be push-fit by hand and will remain coupled without leakage and sufficiently tightly so that an entire line of seven 6-foot length tubes connected end to end and to the member 13, can be rotated as a unit by gripping the terminal tube in the hands and applying torsional forces to the gripped tube solely by the hands. The same is true of the threaded connections.

Other synthetic plastics of comparable qualities may be used.

The ports 3 are cold worked or formed by punching with a hat makers pin or the like, or drilling, as distinguished from hot forming which tends to cause the localized area of the tube to congeal and distort the shape and alignment of the ports. Preferably the ports are about 0.02 to 0.032 inches in diameter and spaced 6 inches apart. With this size and spacing of ports, using plastic tube of one-fourth inch inside diameter, in a range of from 20 p.s.i. to 100 p.s.i., substantially equal height jets can be obtained throughout a 42 foot length. For example, at 30 p.s.i. water pressure and a 42 foot length, jets ranging from 8 feet high nearest the source to 6 feet high at the plugged terminal end of the line can be obtained.

If the ports are made larger, there is an appreciable drop in the hydraulic gradient along the 42 foot line, and if they are made smaller, the flow is inadequate.

Quite frequently, it is desirable both to sprinkle and emit with the water insecticides, fertilizer and the like. For This purpose the valve 8, as more fully described in my above identified copending application, is preferred. This valve comprises a head 20 which may provide the connection to the source of water under pressure. It is arranged so that water can be fed thereinto through an inlet portion 21 controlled by a manual valve 22. Air under pressure can be admitted through an air inlet head 23 controlled by a manual valve 24. Concurrently, fluid fertilizing, cleaning, or disinfecting agents can be induced from a container 25 connected to the valve 8 and under the control of a manual valve 26.

Thus the device is adapted for use for watering and fertilizing concurrently, for spraying and disinfecting or applying insecticides, concurrently, and for cleaning as by injection of water and air under pressure concurrently with the eduction of liquid soap. For temporary fire extinguishing installations, the carrier and chemicals can be admitted concurrently by the valve 8.

In some instances, it is desirable to use one or more tubes and curve the resultant pipe line around a single bush or around some area. For this purpose, as illustrated in FIG. 13, one or more of the tubes 2 are curved about the bush into an approximate circle of the radius desired, and the terminal end of the tube, or of the terminal tube if several tubes are used, is closed by one of the plugs 6. A tie 17, such as a length of cord, is used to tie the tube or tubes at their intersection to hold them in curvilinear shape.

As illustrated in FIG. 14, a single line of connected tubes 2 is arranged to lie between three rows of plants.

In FIG. 15 there is illustrated a serpentine arrangement of the sprinkler dispenser for watering selected shrubs which are in random array.

Referring to FIGS. 16 and 17, a modified tube 2 is shown, having ports 3a. The ports 3a are arranged in pairs, with the ports of each pair directed in converging relationship outwardly from the tube, as illustrated by the arrows X in FIG. 16. The jets discharged by the ports 3a of each pair impinge upon each other and create a mist or drizzle as illustrated, which is quite uniform for a very substantial distance in all directions from the point of impingement of the jets. The pairs of ports 3a are arranged in such proximity that the resultant mists or drizzle intrude into each other and mingle at the margins, so that the mist or drizzle is uniform and uninterrupted over the entire area to be covered.

Referring next to FIG. 18, there is shown a manifold 27 having a plurality of outlets 28, 29 and 30, — three, for example. Each outlet is adapted for connection to a different one of the tubes 2 by a push or threaded fit. This manifold is used for a watering or sprinkling arrangement for plants arranged in parallel rows or for large areas of lawns. Generally, one tube 2 is connected to the outlet 29 and extends lineally along a predetermined path. Tubes 2 are connected to the outlets 28 and 30 and project outwardly, initially transversely of the direction of the tube 2 connected to the outlet 29, and then are curved forwardly and in parallelism therewith, as best illustrated in FIG. 19. In such an arrangement, it is generally desirable that the outlet ports in the tubes be offset axially so that the ports in the central one of the tubes is about midway, axially of the tubes, between the adjacent ports of the parallel tubes 2. This arrangement provides uniform coverage of the area to be watered.

It may be desirable to connect both ends of a tube 2 of a series of tubes 2, to the manifold, as illustrated in FIG. 20, in which case the terminals are connected to different outlets of the manifold and the third outlet is plugged. Hence, the only outlet is through the ports.

In all cases, the order of the tubes in series, both as to ported and non-ported tubes, and the rotated position of each individual tube about its longitudinal axis may be adjusted.

Referring next to FIG. 21, the tubes 2, such as heretofore described, are arranged to provide an outdoor shower. For example, four such tubes 2a are arranged to provide a square. One terminal tube 2a is connected at its inlet end to a valve, such as the valve 8, heretofore described, and the terminal of the other terminal tube 2a is plugged by the terminal plug 6. Suitable fittings 34, such as illustrated in FIG. 22, are provided for connecting the tubes 2a forming the four sides of the square to each other. These fittings have upright connecting sockets 35 which preferably provide push fit connections with selected upright tubes. Two tubes 2b or two sub-assemblies of two or more tubes 2b, are bent into horseshoe shape and crisscrossed, as illustrated in FIG. 21, and are connected at their termini to the upright sockets 35 of the fittings 34, respectively. The tubes 2a forming the sides of the square are so adjusted that they discharge inwardly and upwardly, and the upright arched tubes 2b discharge inwardly toward a common upright axis at the center of the square, thus providing a shower in which water is delivered on all four sides, downwardly from above, and upwardly from beneath or such other angles as may be selected.

Referring to FIG. 23, an arrangement for an auto wash is shown in which a plurality of tubes 2c are arranged in two parallel spaced rows and tubes 2d, or connected group thereof, are arranged upright to form arches through which an automobile can pass. They are connected at lower ends to the tubes 2c, respectively, which, in turn, are connected to the manifold 27. The tubes 2c are arranged generally to spray inwardly and upwardly so as to strike the lower parts and some under surfaces of the automobile. The arched tubes 2d are arranged so that they apply the water to the remainder of the body.

Referring to FIG. 24, there is shown a conventional adjustable hose clamp 36, such as used for connecting automobile hoses to a radiator. Such a clamp may be used for holding the water control handle of the valve 8 in adjusted positions for selected rates of flow desired.

Having thus described my invention, I claim:

1. A distributing dispenser for pressurized fluid, comprising:
   a plurality of long lengths of small diameter tube of synthetic organic plastic, each length having a plurality of small discharge ports arranged in spaced relation to each other, endwise of the tube, and located at least close to the same intersection of a plane defined by the radius and longitudinal axis of the length with the circumferential wall of said length, each of said lengths being imperforate at the opposite side of said plane;

inlet connecting means for connecting one length of tube to a source of fluid under pressure; and means for constraining pressurized fluid, when introduced into said lengths of tube, to discharge through said ports;

characterized in that:

each length of tube has sufficient rigidity to be self-supporting and is readily flexible resiliently transversely of its axis into curvilinear shape, while retaining its normal cross section, by manual bending forces applicable directly by the hands of an operator while the tube is gripped by the operator's hands;

is self-restoring, or readily restorable, from flexed condition, to its original unbent shape when said forces are removed;

has a wall sufficiently resistant to elastic and permanent radial deformation and collapse of its cross section by said forces so that the tube retains its normal cross section under said forces;

is highly resistant to elastic and permanent torsional deformations;

coupling means operable manually to detachably couple said lengths of tube together in end to end coaxial relation in series in selectively adjustable rotated positions about their axes relative to each other and with high resistance to relative rotation by torsional forces; and the resistance of each length to torsional deformation combined with said high resistance to said rotation of the lengths of tube relative to each other provided by the coupling means being sufficient so that the series of connected lengths of tube can be rotated as a unit about the common longitudinal axis, with all of the lengths remain in fixed rotated position relative to each other, by torsional forces applied directly by the hand of an operator in firm gripping engagement with any one of the coupled lengths.

2. The structure according to claim 1 wherein said inlet connecting means are connected to one end of an end one of the lengths of tube so as to permit the connected tube length to be rotated freely about its axis relative to the connecting means while the inlet connecting means are connected to a source.

3. The structure according to claim 2 wherein the coupling means and associated tube lengths have resistance to rotation about the longitudinal axis in either direction relative to each other greater than the resistance to rotation of the inlet connecting means about the common axis to said one of said lengths of tube.

4. The structure according to claim 1 wherein said coupling means are coupling elements, respectively, and said elements are of synthetic organic plastic.

5. The structure according to claim 1 wherein a manifold is provided and is connectable with said source;

said manifold has a pair of outlets; and means are provided for connecting the outer ends of the end ones of the tube lengths to the outlets, respectively.

6. The structure according to claim 1 wherein the ports of at least some of the lengths of tube are generally circular and are arranged in pairs, and the ports of each pair have their axes directed in converging relation to each other outwardly of the tube so that the jets produced by said pair of ports intersect each other at an abrupt angle and the liquid forming each jet is discharged as a unidirectional stream of small cross section, and the streams of each pair atomize each other into a mist pattern; and said pairs of ports of each length of tube are so spaced from each other endwise of the tube axis that adjacent mist patterns merge and intermingle and form a single body of mist coextensive with the length of the associated length of tube.

7. The structure according to claim 6 wherein said axes of each of said pairs of ports are directed at substantially a right angle to each other.

8. The structure according to claim 1 wherein additional manually installable coupling means are provided and are arranged so that at least three of said lengths of tube can be coupled, with the axes of at least two of the thus connected lengths of tube angularly disposed relative to each other and in relatively rotated positions about their axes, respectively, in which jets of one of the two are parallel to a first reference plane and the jets of the other of the two are parallel to a second reference plane angularly disposed to the first reference plane.

9. The structure according to claim 8 wherein the additional manually installable coupling means are arranged so that three lengths of tube can be coupled with the axes of all three of the thus connected lengths of tube angularly disposed relative to each other and in relatively rotated positions about their axes, respectively, in which the jets of each length of tube is parallel to a reference plane, and the reference planes are angularly disposed relative to each other.

* * * * *